July 3, 1956 J. B. OLSEN 2,752,747
SAFETY HITCH
Filed July 22, 1954 2 Sheets-Sheet 1
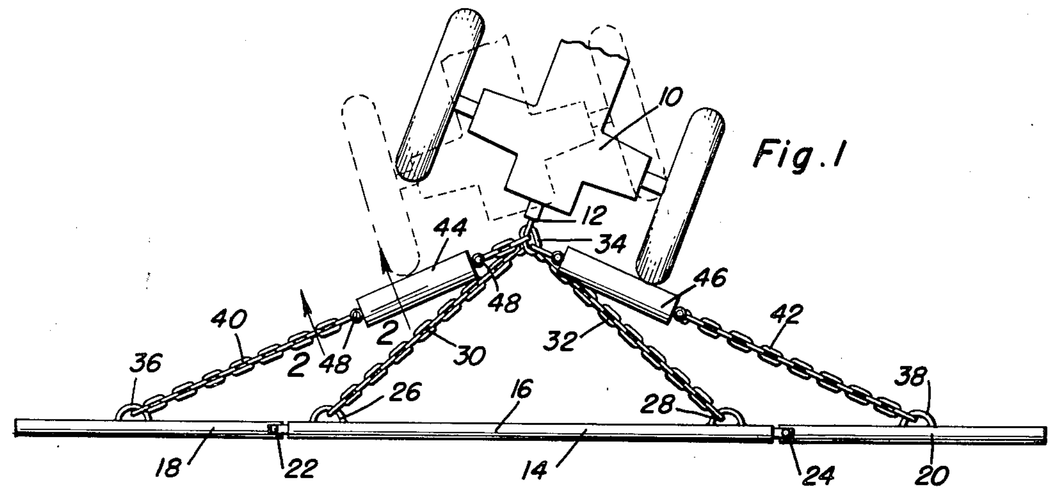
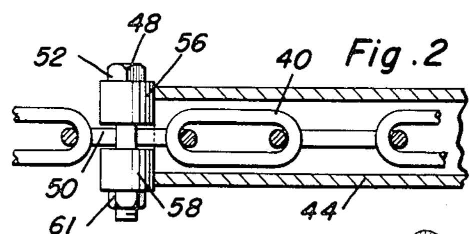
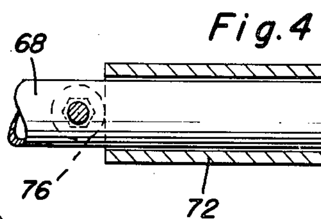
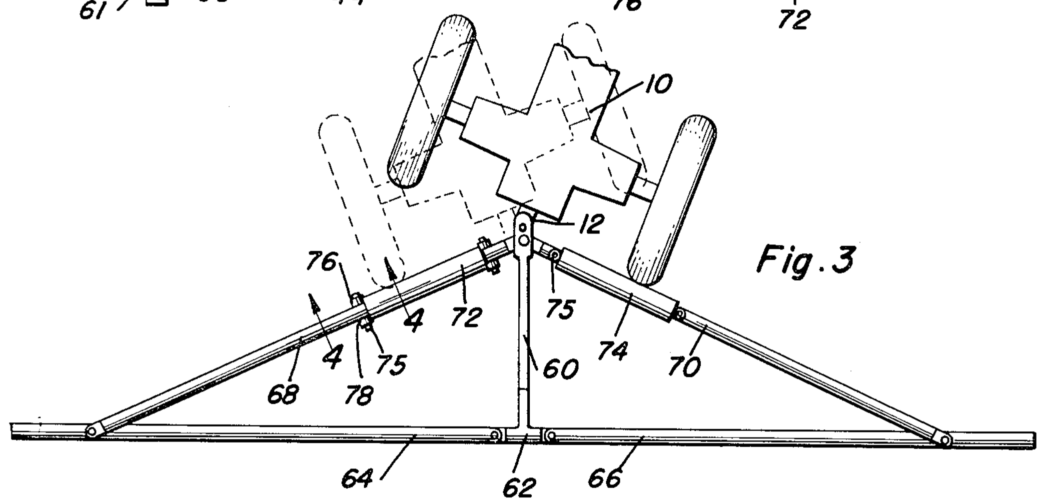
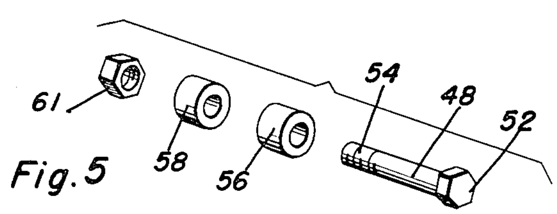
John B. Olsen
INVENTOR.
BY Clarence A. O'Brien and Harvey B. Jacobson
Attorneys SAFETY HITCH
Filed July 22, 1954 2 Sheets-Sheet 2
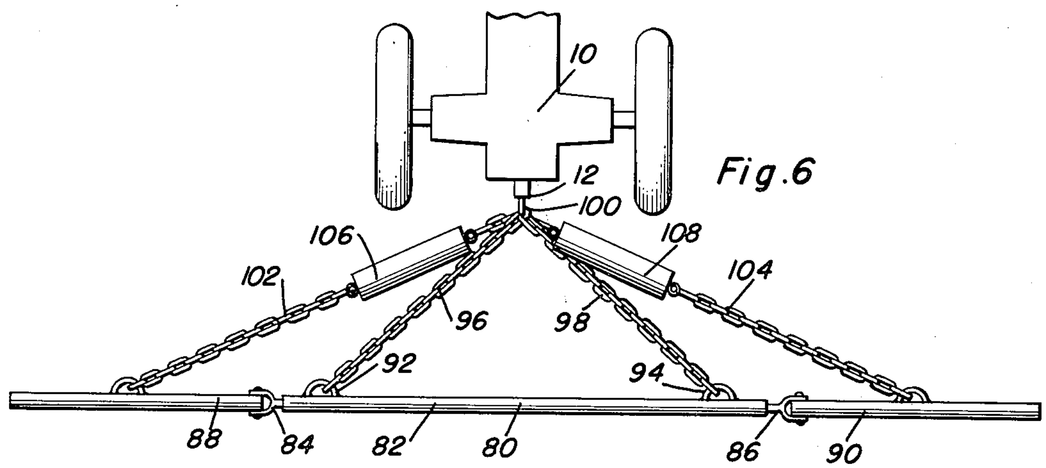
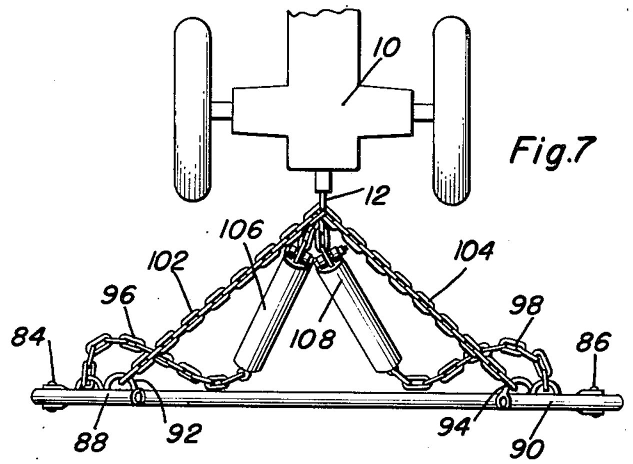
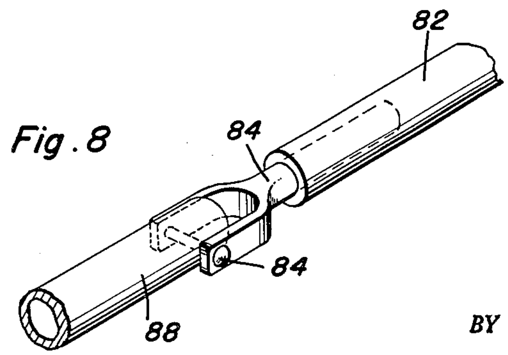
John B. Olsen
INVENTOR.
BY Clarence A. O'Brien
and Harvey B. Jacobson
Attorneys United States Patent Office 2,752,747

Patented July 3, 1956

2,752,747

SAFETY HITCH

John B. Olsen, Atlantic, Iowa

Application July 22, 1954, Serial No. 445,075

3 Claims. (Cl. 55—84)

This invention relates to the class of farm or agricultural machinery, and more particularly to an antichafing hitch for affording maximum protection against accidental injury to the tractor operator and damage to the tractor itself which may occur due to engagement between the tires of the wheels of the tractor and the elements of the hitch.

A further object of the invention resides in the provision of an antichafing hitch for harrows and other farm implements which employs means for reducing the strain on the various elements of the harrow while making a turn and in which the end sections of the draft bar may be pivoted or folded so that the tractor with the draft bar attached may pass through narrow gates and the like.

A further object of the invention resides in the provision of novel antichafing gear which is associated with chains or bars of a hitch and which provides a comparatively large, adjustable and smooth surface for engagement by the wheels of a tractor during sharp turns, thus reducing damage and wear to the tires as well as possible injury to the operator of the tractor or agricultural equipment and damage to the tractor or equipment itself.

Still further objects and features of this invention reside in the provision of a safety hitch which is simple to install and utilize, inexpensive to manufacture, and highly efficient in operation.

These, together with the various ancillary objects and features of the invention which will become apparent as the following description proceeds, are attained by this safety hitch, a preferred embodiment of which has been illustrated in the accompanying drawings, by way of example only, wherein:

Figure 1 is a plan view of the safety hitch comprising the present invention;

Figure 2 is an enlarged sectional view as taken along the plane of line 2—2 in Figure 1 illustrating the construction of the rollers in detail;

Figure 3 is a plan view of a modified form of the invention;

Figure 4 is an enlarged sectional view as taken along the plane of line 4—4 of Figure 3;

Figure 5 is an exploded perspective view illustrating the construction of the bolt with the pairs of rollers mounted thereon;

Figure 6 is a plan view of another safety hitch employing the concepts of the present invention;

Figure 7 is a view of a form of the invention shown in Figure 6 but illustrating the hitch with the end sections of the draft bar in a raised position; and Figure 8 is a partial perspective view illustrating the swivel and pivotal connection between the end section and the central sectional portion of the draft bar.

With continuing reference to the accompanying drawings wherein like reference numerals designate similar parts throughout the various views, and with initial attention directed to Figures 1 and 2, it will be seen that herein there is disclosed a tractor 10 having a drawbar

12 which is adapted to be utilized to pull various types of agricultural equipment. The invention concerns itself with the hitch between the draft bar 14 and the drawbar 12, the draft bar 14 having a central section 16 provided with two end sections 18 and 20 which are pivotally hinged to the central section 16, as at 22 and 24.

Attached to the central section 16 are eyes 26 and 28 to which the chains 30 and 32 are attached, the chains being engaged with a link 34 carried by the drawbar 12. The end sections 18 and 20 have eyes 36 and 38 attached thereto and chains 40 and 42 interconnect the link 34 with the eyes 36 and 38, respectively.

Rotatably mounted and adjustably positioned on the chains 40 and 42 are elongated cylindrical rollers 44 and 46 which form smooth antichafing surfaces which can be engaged by the wheels of the tractor 10. The rollers 44 and 46 are held in place by bolts 48 which extend through links 50 which are selected dependent upon the desired position for the rollers 44 and 46. The bolts 48, as can be best seen in Figure 5, have headed ends 52 and are threaded at their ends 54 and are adapted to have pairs of rollers 56 and 58 positioned thereon on opposite sides of the links 50 and held in place by means of nuts 61.

It is noted that when the wheels of the tractor 10 engage the rollers 44 and 46, a continuous and comparatively smooth surface is engaged by the tractor which will prevent undue wear on the wheels and eliminate the possibility of accidents as may otherwise occur if the chains 40 or 42 were to be engaged by the tires of the wheels of the tractor 10. Further, contact of the wheels with either of the rollers 44 and 46 will cause the end sections 18 and 20 to be bent forwardly with respect to the rest of the draft bar, which will thus reduce the strain on the harrow or other agricultural equipment during turns.

In Figures 3 and 4, there is shown a modified form of the invention in which the drawbar 12 of the tractor 10 is used to tow an agricultural implement through the utilization of a draft bar 60 which has a transverse portion 62 to which end portions 64 and 66 are pivotally attached. Rods 68 and 70 are pivotally attached to the sections 64 and 66 of the draft bar 60 and to the draft bar 60 in lieu of the utilization of the chains. Rollers 72 and 74 are adjustably rotatably mounted on the rods 68 and 70 by means of bolts, as at 75, extending through selected apertures, not shown, formed in the rods 68 and 70. The bolts 75 hold rollers in position whereby the cylindrical rollers 72 and 74 can engage these rollers during rotation thereof, the rollers being designated by reference numerals 76 and 78. The rollers 76 and 78 serve the same function as the rollers 56 and 58 so as to absorb thrust due to motion induced in the elongated cylindrical rollers by the wheels of the tractor 10.

Referring now to the embodiment of the invention shown in Figures 6 through 8, it will be seen that herein the draft bar 80 is formed in three sections with a central section 82 being formed of suitable tubular material and having inserted therein swivel connections 84 and 86 to which the end sections 88 and 90 are pivotally attached. Inasmuch as the swivel connections 84 and 86 may be rotated with respect to the central tubular section 82, it is possible to pivot the end sections 88 and 90 into a raised position, as is shown in Figure 7, when it is desired to draw the draft bar 80 through a narrow gate or the like. Attached to the central section 82 are eyes 92 and 94 to which chains 96 and 98 are attached, the chains being secured to a link 100 to which the chains 102 and 104 are attached. Rollers 106 and 108, arranged in the same manner as the rollers 44 and 46, are mounted on the chains 102 and 104, and when the end sections 88 and 90 are in their non-rotated position, the draft bar 80 functions similarly to the draft bar 14.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A hitch for a tractor having a drawbar and a trailer vehicle having a transverse draft bar comprising means connecting said drawbar and said draft bar, and antichafing means rotatably mounted on said first recited means, said antichafing means including pairs of spaced bolts extending through said first recited means, pairs of rollers on said bolts, and a cylindrical roller extending between each of said pairs of spaced bolts and engaging the pairs of rollers on each of said pairs of spaced bolts.

2. A hitch for a tractor having a drawbar and a trailer vehicle having a transverse draft bar, said draft bar including a central section and end sections hingedly attached to said central section, a first set of chains connecting said central section to said drawbar, a second set of chains connecting said end sections to said drawbar, and antichafing means rotatably mounted on said second set of chains and when engaged by said tractor causing said end sections to pivot forwardly, said antichafing means including pairs of spaced bolts extending through selected links of said second set of chains, pairs of rollers on said bolts, and cylindrical rollers encompassing the portions of said second set of chains between said pairs of spaced bolts, said cylindrical rollers engaging said pairs of rollers.

3. A hitch for a tractor having a drawbar and a trailer vehicle having a transverse draft bar, said draft bar including a central section and end sections hingedly attached to said central section, a first set of chains connecting said central section to said drawbar, a second set of chains connecting said end sections to said drawbar, and antichafing means rotatably mounted on said second set of chains and when engaged by said tractor causing said end sections to pivot forwardly, said antichafing means including pairs of spaced bolts extending through selected links of said second set of chains, pairs of rollers on said bolts, and cylindrical rollers encompassing the portions of said second set of chains between said pairs of spaced bolts, said cylindrical rollers engaging said pairs of rollers, said end sections being swivelly mounted with respect to said central section.

References Cited in the file of this patent

UNITED STATES PATENTS

| | | |
|---|---|---|
| 2,486,483 | Landen | Nov. 1, 1939 |
| 2,582,750 | Donovan | Jan. 15, 1952 |
| 2,609,214 | Vos | Sept. 2, 1952 |

FOREIGN PATENTS

| | | |
|---|---|---|
| 126,287 | Sweden | Sept. 27, 1949 |